US011161628B2

(12) United States Patent
Ehrstein et al.

(10) Patent No.: US 11,161,628 B2
(45) Date of Patent: Nov. 2, 2021

(54) REMOTE AIRCRAFT PREFLIGHT VERIFICATION

(71) Applicant: Textron Aviation Inc., Wichita, KS (US)

(72) Inventors: Christa Diane Sanders Ehrstein, Wichita, KS (US); Joseph Hepburn, Wichita, KS (US); Tarreld David Shriner, Wichita, KS (US)

(73) Assignee: Textron Innovations, Inc., Providence, RI (US)

(*) Notice: Subject to any disclaimer, the term of this patent is extended or adjusted under 35 U.S.C. 154(b) by 335 days.

(21) Appl. No.: 15/795,668

(22) Filed: Oct. 27, 2017

(65) Prior Publication Data
US 2018/0118376 A1 May 3, 2018

Related U.S. Application Data

(60) Provisional application No. 62/415,746, filed on Nov. 1, 2016.

(51) Int. Cl.
B64F 5/60 (2017.01)
G07C 5/00 (2006.01)
G07C 5/08 (2006.01)
G07C 5/12 (2006.01)
H04W 92/10 (2009.01)

(52) U.S. Cl.
CPC .............. B64F 5/60 (2017.01); G07C 5/008 (2013.01); G07C 5/0808 (2013.01); G07C 5/0825 (2013.01); G07C 5/12 (2013.01); G07C 2205/02 (2013.01); H04W 92/10 (2013.01)

(58) Field of Classification Search
CPC ........ B64F 5/60; H04W 92/10; G07C 5/0825; G07C 5/0841; G07C 5/12; G07C 5/0808; G07C 5/008
See application file for complete search history.

(56) References Cited

U.S. PATENT DOCUMENTS

| 4,258,421 | A | 3/1981 | Juhasz et al. |
| 4,313,201 | A * | 1/1982 | Fischer ............... G05D 1/0858 244/194 |
| 6,157,317 | A | 12/2000 | Walker |
| 6,691,007 | B2 | 2/2004 | Haugse et al. |
| 6,941,204 | B2 | 9/2005 | Halm et al. |

(Continued)

Primary Examiner — Mathew Franklin Gordon
(74) Attorney, Agent, or Firm — Erise IP, P.A.

(57) ABSTRACT

A remote aircraft preflight verification method includes sending a request via a remote interface for data from a sensor onboard an aircraft, transmitting the data from the sensor to the remote interface, processing the data via the remote interface to enable a determination that one or more preflight requirements are met, and presenting the data via the remote interface for enabling verification that the one or more preflight requirements are met. The method steps are repeated for multiple sensors. A remote aircraft preflight verification system includes sensors located onboard an aircraft and a remote interface communicatively coupled to the sensors. The remote interface includes a display for presenting data and an interface enabling verification of preflight readiness. The system may optionally include a wireless access point for coordinating the transmitting and receiving of instructions and data between the sensors and the remote interface.

18 Claims, 7 Drawing Sheets

(56) References Cited

U.S. PATENT DOCUMENTS

| | | | |
|---|---|---|---|
| 7,050,894 B2 | 5/2006 | Halm et al. | |
| 8,098,147 B2 * | 1/2012 | Fu | B60T 17/18 |
| | | | 340/445 |
| 8,752,784 B2 | 6/2014 | Jolly et al. | |
| 9,087,419 B2 * | 7/2015 | Lentz | G01M 17/00 |
| 9,457,627 B1 * | 10/2016 | Keller | B64C 25/34 |
| 2004/0087170 A1 | 4/2004 | Di Marzio | |
| 2006/0082451 A1 * | 4/2006 | Shaw | B60C 23/0408 |
| | | | 340/449 |
| 2010/0156629 A1 | 6/2010 | Sexton et al. | |
| 2015/0215684 A1 | 7/2015 | Kauffman et al. | |
| 2015/0316926 A1 | 11/2015 | Ziarno | |
| 2016/0244187 A1 * | 8/2016 | Byers | B64C 39/024 |
| 2016/0272020 A1 * | 9/2016 | Bill | B60C 23/0422 |
| 2017/0309088 A1 * | 10/2017 | Arya | H04L 43/0811 |
| 2018/0053427 A1 * | 2/2018 | Cherepinsky | G05D 1/0669 |

* cited by examiner

REMOTE AIRCRAFT PREFLIGHT VERIFICATION

CROSS-REFERENCE TO RELATED APPLICATIONS

This application claims the benefit of U.S. Provisional Application No. 62/415,746 entitled "Remote Aircraft Preflight Verification" filed on Nov. 1, 2016, which is herein incorporated by reference in its entirety.

BACKGROUND

1. Field

Embodiments of this disclosure relate generally to systems and methods for aircraft safety, and more specifically to a wireless system and method for remotely conducting preflight verification of aircraft components.

2. Description of the Related Art

Preflight inspections are required for the purpose of determining readiness of an aircraft. The process is time consuming and normally involves a crew member walking around the aircraft before departure to visually inspect gauges and other indicators, with many access points that require opening of doors and panels by the crew member.

U.S. Patent Publication 2015/0316926 to Ziarno discloses a system for monitoring aircraft engines during flight that includes a wireless sensor network for monitoring aircraft engine parameters, a processor and memory for collecting and storing data, and a wireless transmitter for transmitting data.

U.S. Pat. No. 7,050,894 to Halm et al. discloses a diagnostic system for maintenance and repair of aircraft that uses sensors to monitor components and wirelessly transmits data to a receiver and displays information on a handset having a display screen.

U.S. Pat. No. 6,691,007 to Haugse et al. discloses a system for monitoring vehicle conditions that includes sensors and a data acquisition unit that wirelessly transmits data to a management system such as a laptop computer.

U.S. Pat. No. 4,258,421 to Juhasz et al. discloses a system for monitoring vehicle parameters and data link means for accessing the parameters that are unrelated to preflight inspections.

U.S. Pat. No. 8,131,406 to Morris et al. discloses a method for testing engine control circuitry for a set of aircraft piston engines prior to flight.

U.S. Patent Publication 2016/0152351 to Shanbhag et al. discloses a wearable near-to-eye (NTE) display system through which a pilot may view aircraft components while performing an aircraft inspection, and which is capable of displaying indicators about the condition or state of the components.

SUMMARY

In an embodiment, a remote aircraft preflight verification method is provided. The method includes sending a request via a remote interface for data from a sensor onboard an aircraft, transmitting the data from the sensor to the remote interface, processing the data via the remote interface to enable a determination that one or more preflight requirements are met, and presenting the data via the remote interface for enabling verification that the one or more preflight requirements are met.

In another embodiment, a remote aircraft preflight verification system is provided. The system includes a plurality of sensors located onboard an aircraft. Each of the plurality of sensors includes a receiver for receiving requests for sensor data, a transmitter for transmitting sensor data, an instrument for monitoring an aircraft component for evaluating preflight readiness, and a battery for electrically powering the receiver, the transmitter, and the instrument. The system further includes a remote interface communicatively coupled to the plurality of sensors. The remote interface includes a remote transmitter for sending requests to the plurality of sensors, a remote receiver for receiving data from the plurality of sensors, a display for presenting data from the plurality of sensors, an interface for receiving instructions, and a processor configured to process instructions received from the interface and to process software instructions stored in non-transitory memory. The software instructions include a program for enabling verification of preflight readiness.

In yet another embodiment, a method for verifying aircraft preflight readiness is provided. The method includes sending a request via a remote interface for data from a wireless access point, sending a request via the wireless access point for data from a sensor onboard the aircraft, transmitting the data from the sensor to the wireless access point, processing the data at the wireless access point, transmitting processed data to a remote interface, and presenting the processed data via the remote interface for enabling verification that the one or more preflight requirements are met.

In still another embodiment, a system for verifying aircraft preflight readiness is provided. The system includes plurality of sensors onboard an aircraft, a first transmitter onboard the aircraft for transmitting data from the plurality of sensors, a wireless access point communicatively coupled to the first transmitter. The wireless access point includes a first receiver for receiving data from the first transmitter, a processor for processing first software instructions stored in non-volatile memory, and a second transmitter for transmitting data. The system further includes a remote interface communicatively coupled to the wireless access point. The remote interface includes a third transmitter for sending requests to the wireless access point, a third receiver for receiving sensor data from the wireless access point, a display for presenting the sensor data, an interface for receiving instructions, and a processor configured to process instructions received from the interface and to process second software instructions stored in non-transitory memory. The second software instructions include a program for enabling verification of preflight readiness.

BRIEF DESCRIPTION OF THE DRAWINGS

Illustrative embodiments of the present disclosure are described in detail below with reference to the attached drawing figures, which are incorporated by reference herein and wherein.

DETAILED DESCRIPTION

The conventional preflight inspection processes, which are time consuming and intrusive, may delay the departure of a flight. Especially for smaller aircraft, which may have only one pilot and no other crew members available to perform the inspection. These delays and burdens are avoided by the systems and methods of the disclosed embodiments.

Figure 1:
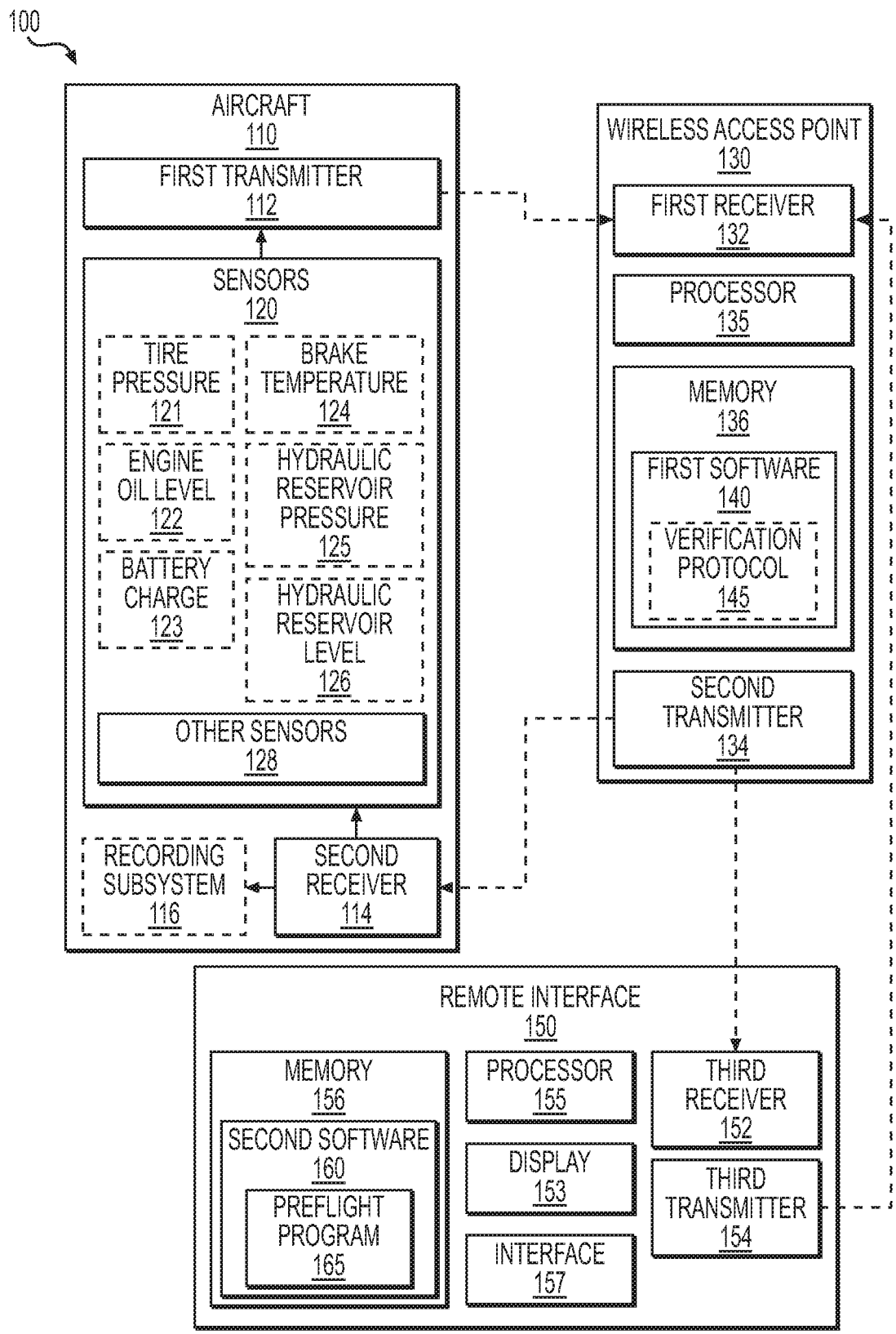
FIG. 1 is a block diagram of a remote aircraft preflight verification system having a wireless access point, in an embodiment.

FIG. 1 is a block diagram of an exemplary system 100 for remote aircraft preflight verification having a wireless access point. System 100 may include one or more sensors 120 located onboard an aircraft 110 and a first transmitter 112 communicatively coupled to sensors 120. Sensors 120 may include, but are not limited to, measuring devices (e.g., instruments) configured to determine the status of the following optional items: tire pressure 121, engine oil level 122, onboard battery charge 123, brake temperature 124, hydraulic reservoir pressure 125, hydraulic reservoir fluid level 126, and other sensors 128. Other sensors 128 are not depicted in FIG. 1 for clarity of illustration, but may include measuring devices for determining among other things, accumulator pressure, accumulator level, auxiliary power unit oil level, quantity of stores (e.g., potable water, food) and lavatory status. The types of measuring devices used in sensors 120 may include thermocouples, pressure transducers, volt meters, magnetic switches, etc. Electrical power provided to sensors 120 may be from a main battery buss onboard aircraft 110 or preferably using self-contained batteries. Sensors 120 having small electrical power requirements may be selected such that sensors 120 operate continuously to provide continuous remote access to sensor data without needing to provide electrical power by running the aircraft's engines.

In certain embodiments, first transmitter 112 is a WiFi and/or Bluetooth enabled wireless transmitter communicatively coupled to each of sensors 120 via a wired and/or wireless communication device. First transmitter 112 is configured to transmit data in a proper format and across a desired range to a wireless access point 130. For example, first transmitter 112 may communicate with first receiver 132 via an IEEE 802.15.4 standard wireless signal or via a Bluetooth-standard wireless signal. As used herein, a wireless access point may be any device capable of simultaneously communicating wirelessly (e.g., via radio waves) with a plurality of other devices (e.g., a plurality of sensors and a remote interface) and optionally with a wired network (e.g., the internet). In certain alternative embodiments, each of sensors 120 includes its own data transmitter capable of wirelessly communicating with wireless access point 130, or directly with a remote interface 150 as described below in connection with FIG. 3.

Wireless access point 130 is configured to collect information from sensors 120, consolidate the information (e.g., into packets), and transmit the consolidated information to remote interface 150. Wireless access point 130 may include a first receiver 132 configured to wirelessly receive data from, for example, first transmitter 112. A second transmitter 134 is configured to transmit consolidated information to remote interface 150 and optionally to aircraft 110. Wireless access point 130 may further include a memory 136, including a non-transitory medium for storing a first software 140, and a processor 135 for executing instructions of first software 140. Memory 136 in some embodiments is a memory system that includes both transitory memory such as RAM and non-transitory memory such as, ROM, EEPROM, Flash-EEPROM, magnetic media including disk drives, and optical media. Memory 136 stores first software 140 as machine readable instructions executable by processor 135. Exemplary software instructions of first software 140 may include instructions for when to receive data from sensors 120, how to packet the data for transmission, and when to transmit the data to remote interface 150. For example, instructions of first software 140 may query sensors 120 to request transmission of data from second transmitter 134 to second receiver 114. An optional verification protocol 145 may provide instructions for verifying that the data packets are complete and uncorrupted and may provide a verification receipt upon transmittal of the data packets.

Wireless access point 130 may be located at a ground terminal at an airport or preferably onboard aircraft 110 and may receive electrical power via standard alternating current outlet, an auxiliary power unit, batteries, or an aircraft generator. Data may be transmitted to other locations in addition to remote interface 150, such as an optional aircraft recording subsystem 116 via a second receiver 114 onboard aircraft 110, and used for additional purposes, such as maintenance scheduling, historical records, or to supplement in-flight aircraft data, for example.

Remote interface 150 includes a third receiver 152 configured to receive data from second data transmitter 134, a display 153 for displaying data to a crew member, an interface 157 for receiving input from the crew member, a memory 156, including a non-transitory medium for storing a second software 160, and a processor 155 for executing instructions of second software 160. Memory 156 is an example of memory 136, FIG. 1. Remote interface 150 is for example a computer, desktop computer, laptop computer, tablet, smart phone, smart watch or similar device (see e.g., FIGS. 5-7). Interface 157 is for example one or more of a keyboard, mouse, touch screen, and microphone. Second software 160 includes instructions (e.g., a preflight program 165) for processing sensor data from wireless access point 130 for presenting to the crew member in a clear and intuitive format for an efficient determination on the aircraft's capability to complete the mission, as further described below in connection with FIGS. 5-7.

In operation, system 100 is used for performing remote preflight verification of aircraft 110. While using system 100, remote interface 150 queries wireless access point 130 to request sensor data from sensors 120, as described below for method 200 in connection with FIG. 2. Wireless access point 130 in turn requests data from one or more of sensors 120, processes the data (e.g., consolidates data) and returns the data to remote interface 150 for displaying to the crew member. Alternatively, the crew member may use remote interface 150 to query sensors directly, as described below in connection with system 300, FIG. 3.

Figure 2:
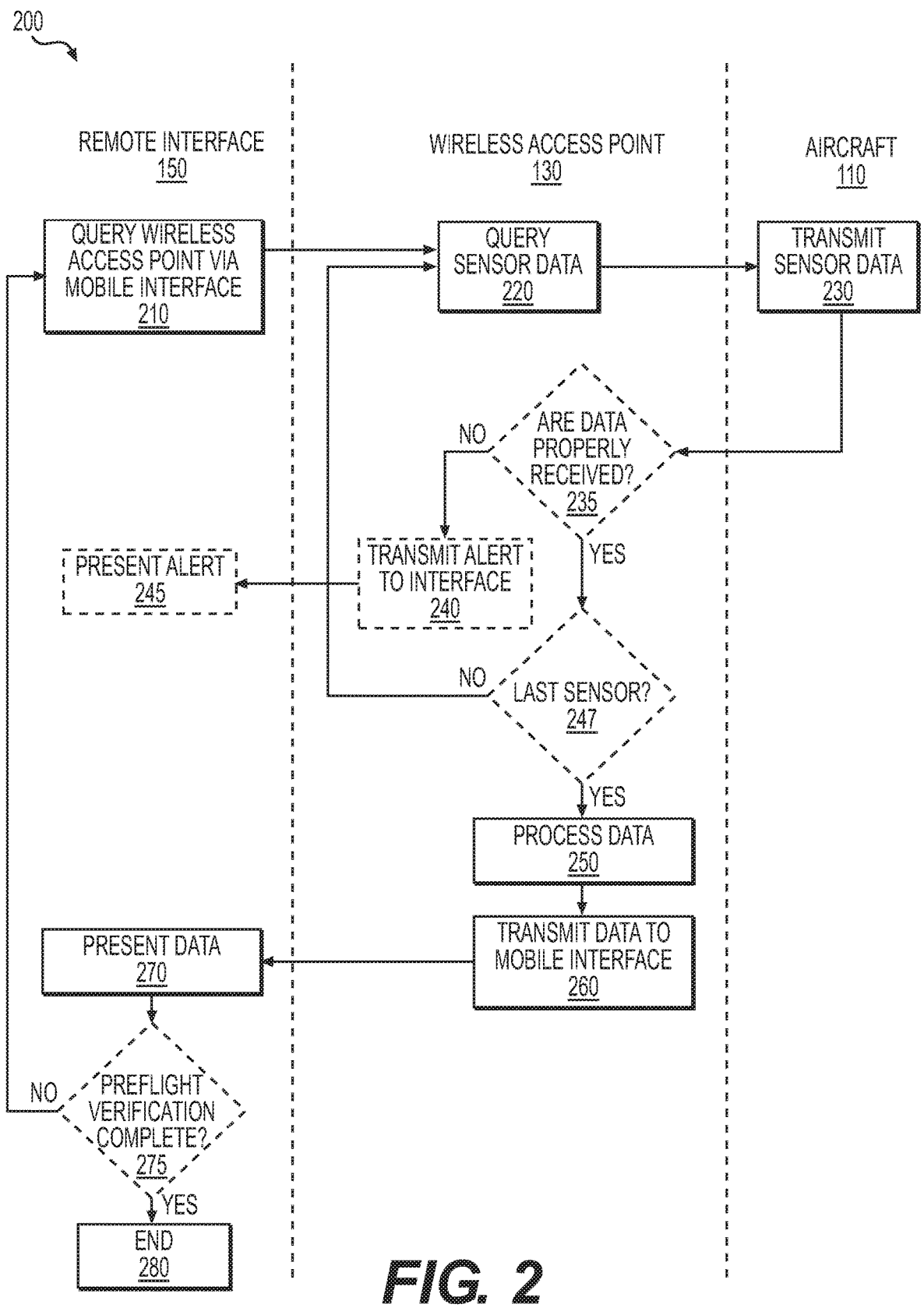
FIG. 2 is a flow diagram of a method for remote aircraft preflight verification performed using the system of FIG. 1, in an embodiment.

FIG. 2 is a flow diagram of an exemplary remote aircraft preflight verification method 200, which may be performed using system 100, FIG. 1, for example.

In a step 210, a wireless access point is queried via a remote interface. In an example of step 210, wireless access point 130 is queried via remote interface 150, FIG. 1 to request sensor data. For example, the crew member may instruct remote interface 150 to request data from wireless access point 130.

In a step 220, the wireless access point queries the sensors for data. In an example of step 220, wireless access point 130 queries sensors 120 to request data. The data from sensors 120 may include real-time values and/or historical values (e.g., values recorded periodically since a previous flight to indicate any trends).

In a step 230, data from sensors is transmitted to the wireless access point. In an example of step 230, data from sensors 120 is transmitted to wireless access point 130. This may include data from selectable individual sensors or from all of sensors 120.

An optional step 235 is a decision. If in step 235 sensor data are properly received, method 200 proceeds to step 247. Otherwise method 200 proceeds to step 240. For example, step 235 checks if a sensor did not send a signal or if the signal is invalid (e.g., the sensor failed to send the value within an expected time window).

In an optional step 240, an alert is transmitted to a remote interface. In an example of step 240, wireless access point 130 transmits an alert to remote interface 150.

In an optional step 245, the alert is presented by the remote interface. In an example of step 245, remote interface 150 presents the alert to notify the crew member of a potential problem with one or more sensors 120. If one or more of sensors 120 fail to properly report data, the crew member may default to a walk around process to manually perform preflight verification.

An optional step 247 is a decision. If in step 247 it is determined that the last sensor to be queried has transmitted data, method 200 proceeds to step 250. Otherwise, method 200 returns to step 220 to query one or more additional sensors for data.

In a step 250, data are processed. In an example of step 250, data from sensors 120 are processed via processor 135 of wireless access point 130. Processing the data may include consolidating data from a plurality of sensors 120, consolidating data from a sensor collected over a period of time (e.g., time averaging the data), packeting the data for transmission, and verifying that the data packets are complete and uncorrupted. In an embodiment, verification protocol 145, FIG. 1 may provide a verification receipt for transmittal with a verified data packet.

In a step 260, data are transmitted to the remote interface. In an example of step 260, wireless access point 130 transmits processed data via second transmitter 134 to remote interface 150, FIG. 1. Data may be transferred in consolidated packets along with a verification receipt.

In a step 270, data are presented to the crew member. In an example of step 270, instructions from preflight program 165, FIG. 1 are used to process data from sensors 120 for presenting to the crew member in a clear and intuitive format to enable an efficient determination of the aircraft's capability to complete the mission. The data may be presented using a series of "check and acknowledge" steps, or the data may be summarized and presented using a consolidated report for the crew member to review. Visual confirmation and use of independent means (e.g., an analog pressure gauge to verify tire pressure), may be appropriate and applicable if the crew member suspects or observes a potential issue from data presented in step 270.

An optional step 275 is a decision. If in step 275, the crew member determines that the preflight verification is complete, he or she may provide instructions via interface 157 to complete the preflight verification in a step 280. Otherwise, the crew member may provide instructions to return to step 210. For example, data presented to the crew member in step 270 may indicate a potential issue that requires investigation and/or corrective action by the crew member, in which case the crew member may provide appropriate instruction for how to proceed with the preflight verification process. Following correction of a potential issue, the appropriate sensors may again be queried by returning to step 210. Once all potential issues are resolved, the crew member may proceed to step 280 and end the preflight verification.

In a step 280, the crew member may complete the preflight verification after confirming that all data from sensors 120 meet any preflight requirements. The preflight requirements may be provided to the crew member independently, via a placard for example, such that the burden remains with the crew member to confirm that that all data from sensors 120 meet the preflight requirements. In other words, method 200 does not provide an indication of whether or not the aircraft is ready for flight, instead the crew member makes this determination.

Figure 3:
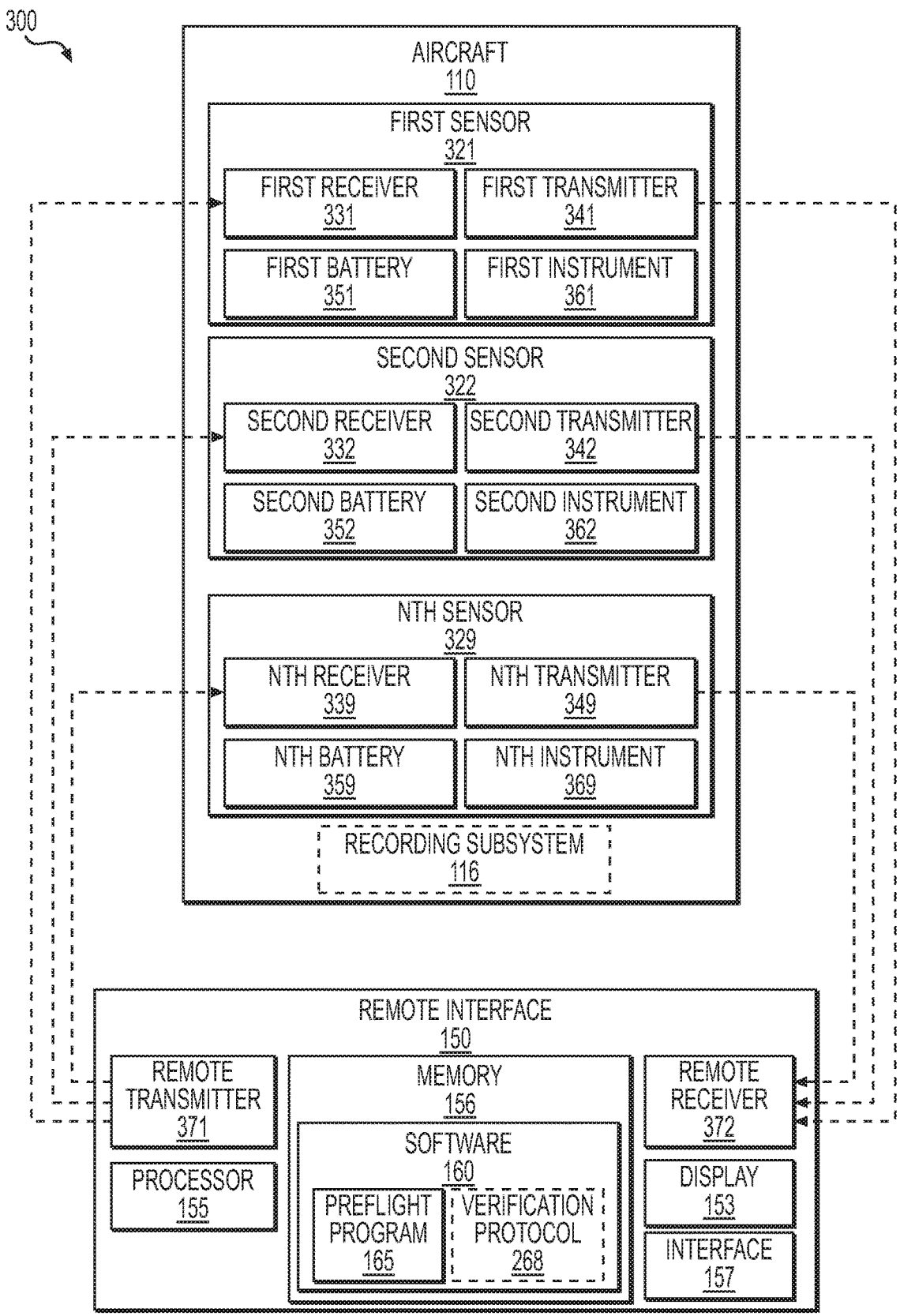
FIG. 3 is a block diagram of a remote aircraft preflight verification system lacking a wireless access point, in an embodiment.

FIG. 3 is a block diagram of an exemplary remote aircraft preflight verification system 300, which is an alternative embodiment to system 100, FIG. 1. Specifically, system 300 lacks a wireless access point, such as wireless access point 130, FIG. 1. Instead, a plurality of sensors located onboard aircraft 110 are each configured with a transmitter and receiver for communicating directly with remote interface 150. System 300 includes many of the same components as system 100, which are enumerated with like numerals.

A first sensor 321 includes a first receiver 331 and a first transmitter 341; a second sensor 322 includes a second receiver and a second transmitter 342; and so on up to an Nth sensor 329, which includes an Nth receiver 339 and an Nth transmitter 349, where N is a non-negative integer greater than two. Each transmitter is configured to transmit the data in a proper format and across a desired range to remote interface 150. The sensors may each include a battery to provide independent and continuous electrical power, and an instrument for monitoring a feature of interest onboard aircraft 110. For example, first sensor 321 includes a first battery 351 and a first instrument 361, second sensor 322 includes a second battery 352 and a second instrument 362, and Nth sensor includes an Nth battery 359 and an Nth instrument 369. In an embodiment, one or more of sensors 321, 322, . . . 329 includes a processor and a memory, such as a microprocessor, microcontroller, or programmable logic controller, for controlling the instrument and processing data prior to transmittal to remote interface 150.

Each instrument is a measuring device or monitoring unit that is appropriate and suitable for the aircraft component and materials being detected. For example, for a hydraulic reservoir, an instrument may use materials compatible with the hydraulic fluids approved for aircraft 110. The instruments may be configured for measuring anticipated pressures, temperatures, and other appropriate environmental conditions, such as those listed in DO-160 Environmental Conditions and Test Procedures for Airborne Equipment.

Remote interface 150 includes a remote transmitter 371 for transmitting instructions stored in memory 156 to first sensor 321 and second sensor 322, up to Nth sensor 329. For example, a preflight program 165 of software 160 may include instructions for querying sensors 321, 322, . . . 329 via remote transmitter 371. Remote transmitter 371 is an example of third transmitter 154, FIG. 1. Preflight program 165 may include an interactive display that the crew member may manipulate via interface 157 for viewing sensor data. A remote receiver 372 receives data transmitted from each of sensors 321, 322, . . . 329. Remote receiver 372 is an example of third receiver 152, FIG. 1. Preflight program 165 may process data from the sensors and present the data via display 153 for viewing by the crew member. Software 160 may optionally include a verification protocol 268, which is an example of verification protocol 145, FIG. 1 for verifying that data packets are complete and uncorrupted, and for providing a verification receipt upon transmittal of the data packets. In an embodiment, verification protocol 268 includes security features to prevent unauthorized access, such as preventing someone from hacking into system 300.

Figure 4:
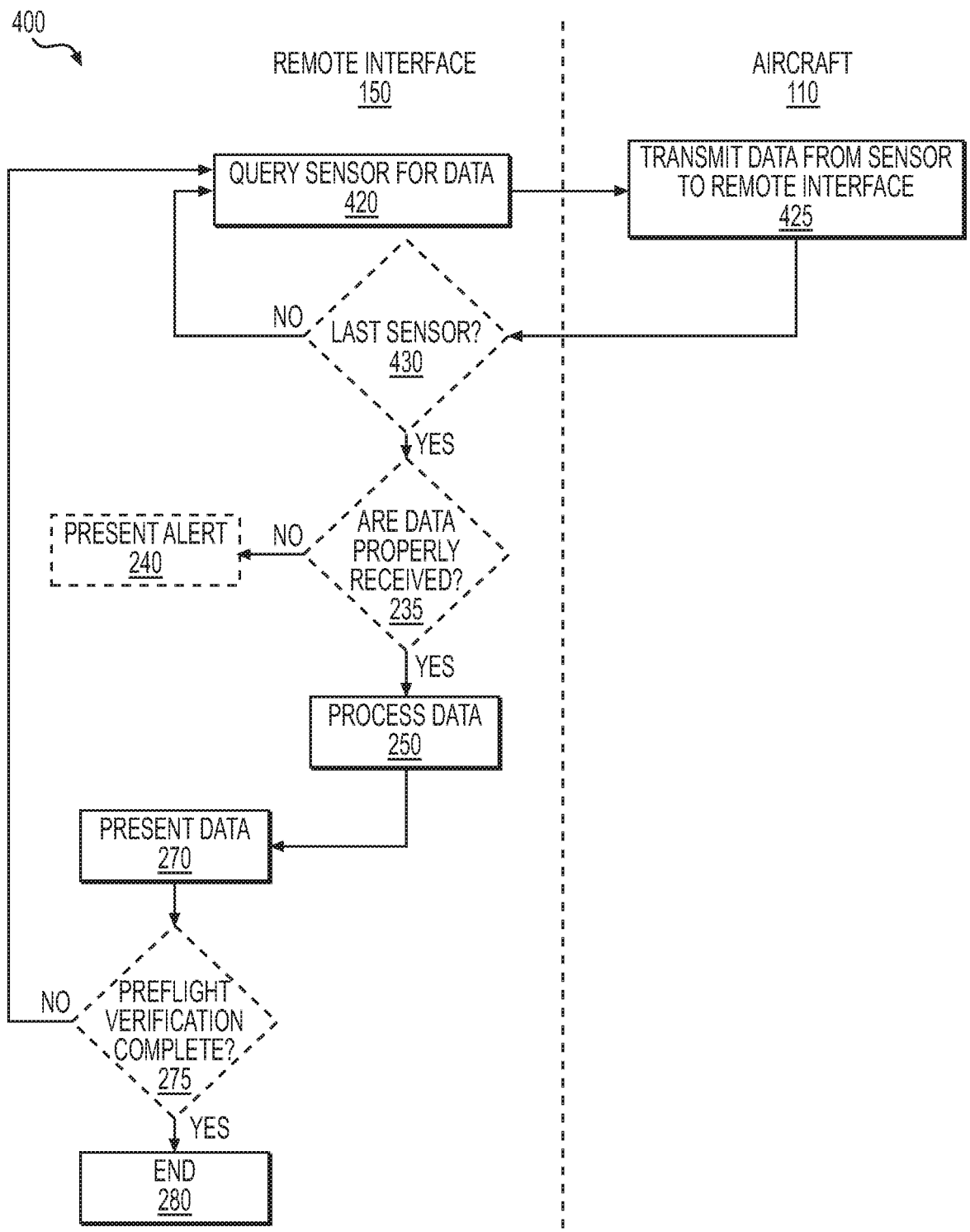
FIG. 4 is a flow diagram of a method for remote aircraft preflight verification performed using the system of FIG. 3, in an embodiment.

FIG. 4 is a flow diagram of an exemplary remote aircraft preflight verification method 400. Method 400 is an example of method 200, FIG. 2 that may be performed using system 300, FIG. 3, for example. Steps of method 400 that are the same as method 200 are enumerated with like numerals.

In a step 420, the remote interface queries a sensor for data. In an example of step 420, remote interface 150 queries first sensor 321, FIG. 3 for real-time data. The sensor data may be displayed on remote interface 150 as described below in connection with FIGS. 5 and 6.

In a step 425, data from the sensor is transmitted to the remote interface. In an example of step 425, first sensor 321 transmits data via first transmitter 341 to remote interface 150, which receives the data via remote receiver 372, FIG. 3.

Optional step 430 is a decision. If in step 430 remote interface 150 determines that the last sensor has been queried, method 400 proceeds to a step 240. Otherwise, method 400 returns to step 420 such that remote interface 150 queries the next sensor.

Once data from the last sensor is transmitted to remote interface 150, method 400 proceeds with steps 235 to 280, which are the same as method 200, FIG. 2. Alternatively, steps 235 to 280 are performed concurrently with steps 420 and 425 for a plurality of sensors such that data from sensors are processed continually in the order received. One difference between method 200 and method 400 is that method 200 includes step 260 to transmit data from wireless access point 130 to remote interface 150, which is omitted from method 400 since the data are transmitted directly from the sensors to remote interface 150 in step 425. Another difference is in step 275. In step 275 of method 400, the crew member may instruct remote interface 150 to query one or more particular sensors rather than all of the sensors or the sensor data compiled at wireless access point 130 (as with method 200) since each sensor of system 300 may independently transmit data directly to remote interface 150.

Compared to a typical preflight inspection that requires a crew member to walk around, advantages of using methods 200 and 400 include minimizing the intrusiveness of a manual preflight verification process that requires opening and closing of multiple access doors by the crew member, therefore improving the safety of the process. In addition, the time it takes to conduct the preflight verification may be reduced, and the process may be carried out remotely prior to arrival at the airport by the crew member. Thus, the amount of time required to prepare the aircraft for departure prior to arrival by the crew member at the airport may be greatly reduced. Although systems 100 and 300 are preferably used for preflight verification, they may also be used during flight to provide supplemental information to the crew member.

In an embodiment, an aircraft preflight verification method is performed based on a combination of methods 200 and 400, such that one or more sensors communicate with remote interface 150 via wireless access point 130, while at least one additional sensor communicates directly with remote interface 150. Such a method may use a hybrid of systems 100 and 300, which includes wireless access point 130 of FIG. 1 and first sensor 321 having first transmitter 341, FIG. 3 for directly communicating with remote interface 150.

Figure 5:
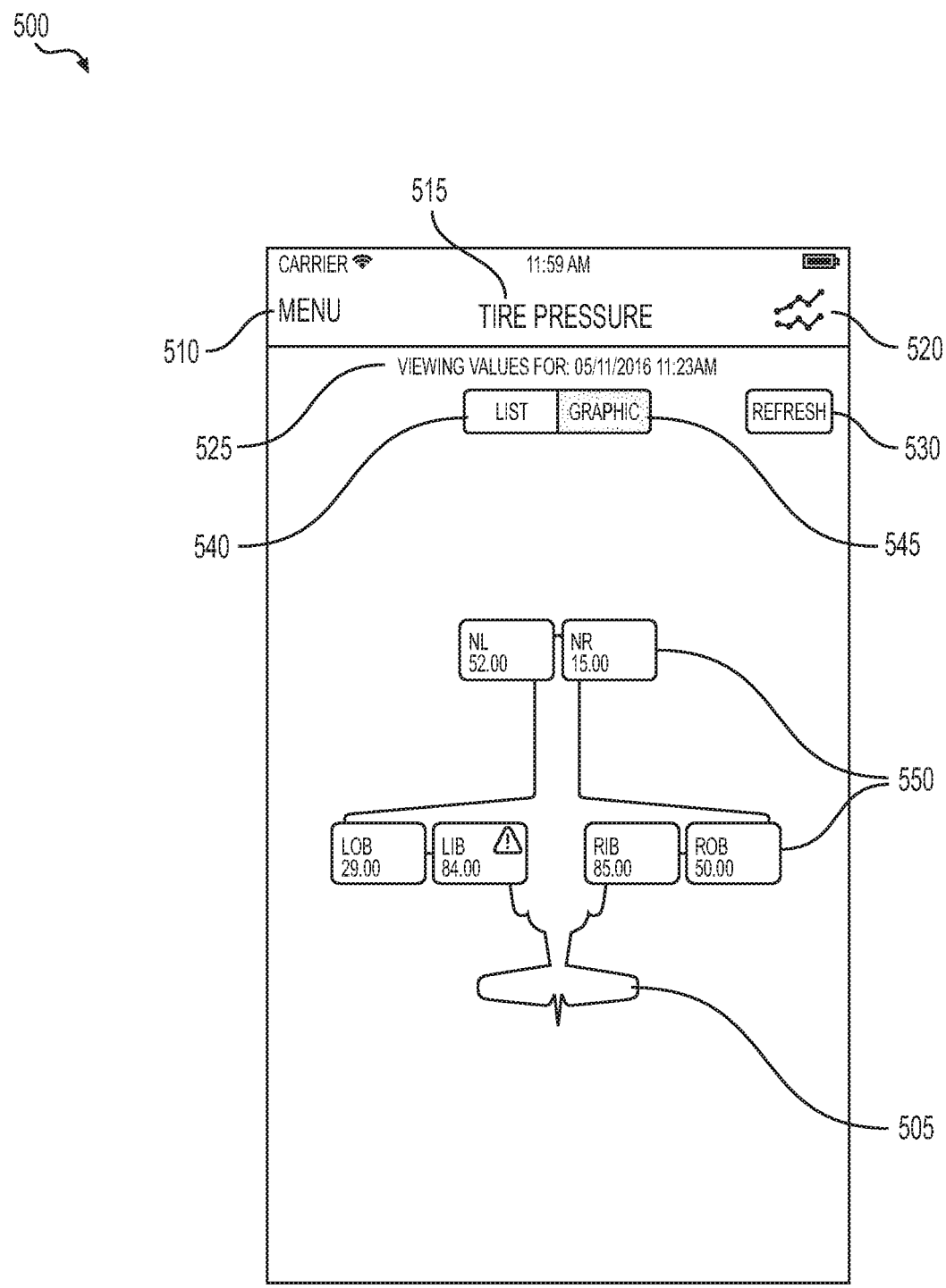
FIG. 5 shows a remote interface for viewing sensor data to perform an aircraft preflight verification method, in an embodiment.

FIG. 5 shows an exemplary remote interface 500 for viewing sensor data to perform an aircraft preflight verification method. Remote interface 500 is an example of remote interface 150, FIGS. 1 and 3, configured as a mobile application for a smartphone to display information and receive input via a touch screen device. Remote interface 500 provides a graphic display of data from sensors via preflight program 165 of software 160, FIG. 1. For example, as depicted in FIG. 5, remote interface 500 may display real-time data for tire pressure 550. The tire locations are depicted on an aircraft outline 505, including nose-left (NL), nose-right (NR), left-outboard (LOB), left-inboard (LIB), right-inboard (RIB), and right-outboard (ROB).

Remote interface 500 includes display of information such as title 515, timestamp 525, and tire pressure 550. Title 515 indicates for example the type of data being viewed on the current display. Timestamp 525 may indicate when real-time data were retrieved from the sensors. Buttons for user interaction include menu 510, historical data 520, refresh 530, list 540, and graphic 545. Menu 510 enables the user to switch the display for viewing data from, and interacting with, alternate sensors, such as sensors 121-128, FIG. 1. Historical data 520 is based on real-time sensor data that has been periodically stored in memory 156 of remote interface 150. As described below in connection with FIG. 7, historical data 520 enables display of data over time to observe any trends. Refresh 530 enables refreshing the data displayed, which may require querying the wireless access point (e.g., step 210, FIG. 2) or querying sensors directly (e.g., step 420, FIG. 4). List 540 enables an alternate presentation of the data in a list format (see e.g., FIG. 6). Graphic 545, which is highlighted in FIG. 5 to indicate that the graphic view has been selected, enables presentation of the data in a graphical format.

Figure 6:
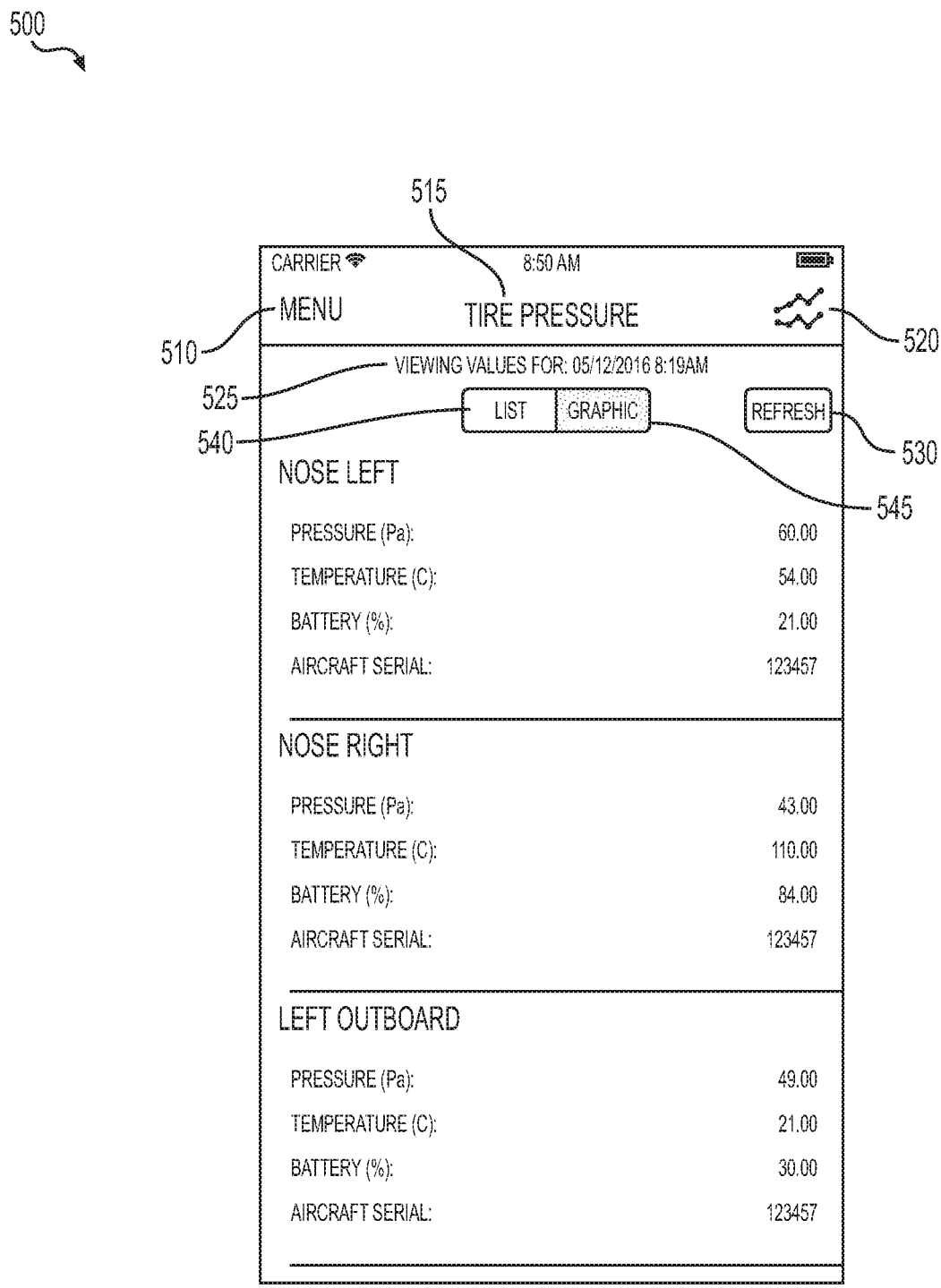
FIG. 6 shows the remote interface of FIG. 5 with sensor data alternatively presented in a list format.

FIG. 6 shows remote interface 500 with data alternatively presented in a list format. The list format may be selected using button 540, which is highlighted in FIG. 6 to indicate its selection. The list view may include additional information not included in the graphic, such as tire temperature in degrees Celsius, the percent of battery remaining in the tire sensor, and the aircraft serial number. For example, the display may list real-time tire pressure values, real-time tire temperature values, and real-time tire-pressure gauge battery percent remaining for the aircraft's tires. The list may extend beyond the available screen size and may be scrolled to view any additional information at the bottom of the list (e.g., information for left-inboard, right-inboard, and right-outboard tires).

Figure 7:
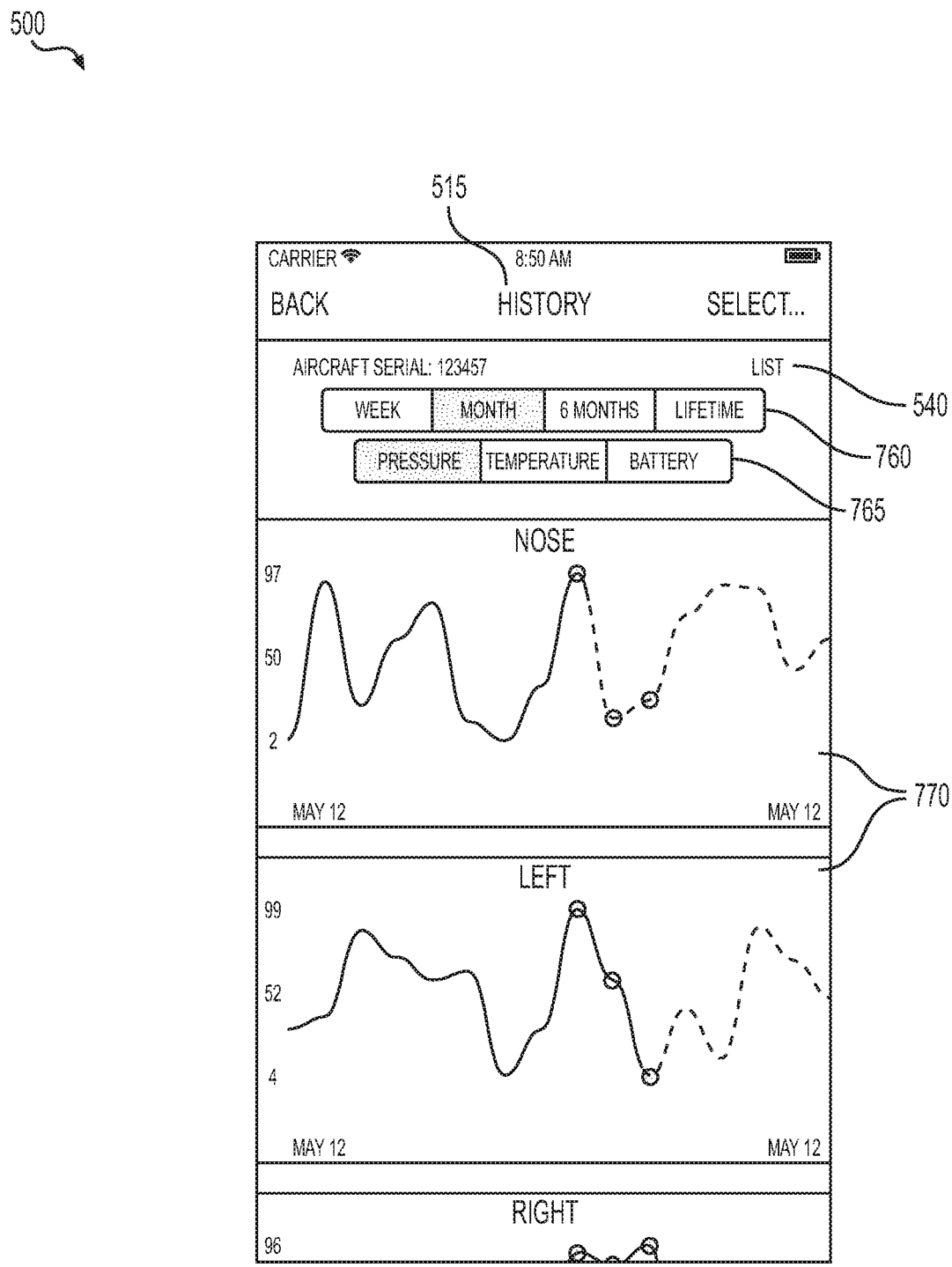
FIG. 7 shows the remote interface of FIG. 5 with historical data presented.

FIG. 7 shows remote interface 500 with exemplary historical data presented. Buttons for duration 760 and data-type 765 enable the user to change the display for different durations of historical data (e.g., week, month, 6 months, lifetime) and to change the type of data to display (e.g., pressure, temperature, battery), respectively. For example, the display may include plots of historical tire pressure values, historical tire temperature, and historical real-time tire-pressure gauge battery percent remaining for the aircraft's tires. Plots 770 of historical data enable visualization of any trends that may be present in the data.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all operations listed in the various figures need be carried out in the specific order described.

We claim:

1. A remote aircraft preflight verification method, comprising:
    prior to arrival at an airport, sending a request via a remote user interface for data regarding a first aircraft system maintenance condition from a first sensor of a plurality of sensors onboard an aircraft located at the airport;
    transmitting the data from the first sensor to the remote user interface;
    sending a request via the remote user interface for data regarding a second aircraft system maintenance condition from a second sensor of the plurality of sensors onboard the aircraft located at the airport;
    transmitting the data from the second sensor to the remote user interface; sending a request via the remote user interface for data regarding a third aircraft system maintenance condition from a third sensor of the plurality of sensors onboard the aircraft located at the airport;
    transmitting the data from the third sensor to the remote user interface;
    determining via the remote user interface whether data from additional sensors of the plurality of sensors are to be requested, such that the next step is either:
        a) sending a request via the remote user interface for data from an additional sensor of the plurality of sensors and transmitting the data from the additional sensor to the remote interface; or
        b) processing the data via the remote user interface;
    receiving inputs from the remote user interface to modify display features for displaying the data to assist with making a determination that one or more preflight requirements are met; and
    presenting the data regarding the first, second, and third aircraft system maintenance conditions independently based on the inputs via the remote user interface for enabling verification that the one or more preflight requirements regarding the first, second, and third aircraft system maintenance conditions are met prior to arrival at the airport.

2. The method of claim 1, further comprising determining if the data are properly received and presenting an alert via the remote interface when the data are not properly received.

3. The method of claim 1, further comprising receiving an indication that the preflight verification is incomplete and repeating the steps of sending a request, transmitting the data, determining whether data from additional sensors are to be requested, processing the data, receiving inputs, and presenting the data until the preflight verification is complete.

4. A remote aircraft preflight verification system, comprising:
    a plurality of sensors located onboard an aircraft, each of the plurality of sensors configured to read a system maintenance characteristic, each sensor in the plurality comprising:
        a receiver for receiving requests for sensor data;
        a transmitter for transmitting sensor data;
        an instrument for monitoring an aircraft component for evaluating preflight readiness; and
        a battery for electrically powering the receiver, the transmitter, and the instrument;
    a remote user interface communicatively coupled to the plurality of sensors, the remote user interface comprising:
        a remote transmitter for sending requests to the plurality of sensors;
        a remote receiver for receiving data from the plurality of sensors;
        a display for presenting data from the plurality of sensors;
        a user interface for receiving instructions; and
        a processor configured to process instructions received from the user interface and to process software instructions stored in non-transitory memory, wherein the software instructions include a program for enabling verification of preflight readiness based on a read maintenance characteristic; and
    the remote user interface is configured to receive an indication for selecting a graphic view, the graphic view presenting data from the plurality of sensors in a graphical format that conveys locations of the plurality of sensors on an aircraft and the read maintenance characteristic; and
    wherein the display is configured to plot historical data received over time from the plurality of sensors based on instructions received via the user interface.

5. The system of claim 4, further comprising a wireless access point communicatively coupled to the plurality of sensors and the remote interface for coordinating the transmitting and the receiving of instructions and data between the plurality of sensors and the remote user interface.

6. A method for verifying aircraft preflight readiness, comprising:
    sending a request via a remote interface for data from a wireless access point;
    sending a request via the wireless access point for data from a sensor onboard the aircraft;
    transmitting the data from the sensor to the wireless access point;
    repeating the steps of sending a request via the wireless access point and transmitting the data from the sensor to the wireless access point for a plurality of sensors onboard the aircraft, wherein the plurality of sensors are configured to monitor three or more of tire pressure, engine oil level, onboard battery charge, brake temperature, hydraulic reservoir pressure, hydraulic reservoir fluid level, accumulator pressure, accumulator level, auxiliary-power-unit level, or quantity of stores;
    processing the data from the plurality of sensors at the wireless access point;
    transmitting the data processed from the plurality of sensors to a remote interface; and presenting the data processed from the plurality of sensors via the remote interface for enabling verification that a plurality of preflight requirements are met prior to departure of an aircraft.

7. The method of claim 6, further comprising determining if the data processed from the plurality of sensors are properly received via the wireless access point and presenting an alert via the remote interface when the data are not properly received.

8. The method of claim 6, further comprising receiving an indication that a preflight verification is incomplete and repeating the steps of sending a request via a remote interface, sending a request via the wireless access point, transmitting the data, processing the data, and presenting the data, until the preflight verification is complete.

9. The method of claim 6, wherein the plurality of sensors comprise tire pressure gauges and the step of presenting the processed data comprises presenting tire pressure values from the tire pressure gauges via a graphic display of the aircraft with tire pressure values listed at aircraft positions corresponding to respective tire positions.

10. The method of claim 9, wherein the step of presenting the processed data comprises listing real-time tire pressure values, real-time tire temperature values, and real-time tire-pressure gauge battery percent remaining for the aircraft's tires.

11. The method of claim 9, wherein the step of presenting the processed data comprises plotting historical tire pressure values, historical tire temperature, and historical real-time tire-pressure gauge battery percent remaining for the aircraft's tires.

12. A system for verifying aircraft preflight readiness, comprising:
a plurality of sensors onboard an aircraft, the plurality of sensors configured to monitor and establish a value for at least four of tire pressure, engine oil level, onboard battery charge, brake temperature, hydraulic reservoir pressure, hydraulic reservoir fluid level, accumulator pressure, accumulator level, and auxiliary-power-unit level;
a first transmitter onboard the aircraft for transmitting data from the plurality of sensors;
a wireless access point communicatively coupled to the first transmitter, the wireless access point comprising:
a first receiver for receiving data from the first transmitter;
a processor for processing first software instructions stored in non-volatile memory; and
a second transmitter for transmitting data;
a remote interface communicatively coupled to the wireless access point, the remote interface comprising:
a third transmitter for sending requests to the wireless access point;
a third receiver for receiving sensor data from the wireless access point;
a display for presenting the sensor data;
an interface for receiving instructions; and
a processor configured to process instructions received from the interface and to process second software instructions stored in non-transitory memory, wherein the second software instructions include a program for enabling verification of preflight readiness;
the program for enabling verification of preflight readiness comprises a series of interactive steps presented on the display and configured to receive instructions via the interface as to whether a plurality of aircraft subsystems have passed inspection based on data regarding the value for the at least four of tire pressure, engine oil level, onboard battery charge, brake temperature, hydraulic reservoir pressure, hydraulic reservoir fluid level, accumulator pressure, accumulator level, and auxiliary-power-unit level which are received from the plurality of sensors; and
wherein the display is configured to plot historical data received over time from the plurality of sensors based on instructions received via the user interface.

13. The system of claim 12, wherein the wireless access point is located onboard the aircraft.

14. The system of claim 12, wherein the first software instructions comprise instructions for consolidating data from a plurality of sensors at the wireless access point for transmitting via the second transmitter.

15. The system of claim 12, wherein the plurality of sensors comprise tire pressure gauges and the display for presenting tire pressure values from the tire pressure gauges includes a graphic display of the aircraft with tire pressure values listed at aircraft positions that correspond to the respective tire positions.

16. The system of claim 12, wherein the display lists real-time tire pressure values, real-time tire temperature values, and real-time tire-pressure gauge battery percent remaining for the aircraft's tires.

17. The system of claim 15, wherein the display plots historical tire pressure values, historical tire temperature, and historical real-time tire-pressure gauge battery percent remaining for the aircraft's tires.

18. The system of claim 12, wherein the plurality of sensors are configured to monitor tire pressure, engine oil level, onboard battery charge, brake temperature, hydraulic reservoir pressure, hydraulic reservoir fluid level, accumulator pressure, accumulator level, and auxiliary-power-unit level.

* * * * *